(12) United States Patent
Reimann et al.

(10) Patent No.: US 11,432,469 B2
(45) Date of Patent: Sep. 6, 2022

(54) METHOD FOR PREDICTION OF SOIL AND/OR PLANT CONDITION

(71) Applicant: HEXAGON TECHNOLOGY CENTER GMBH, Heerbrugg (CH)

(72) Inventors: Bernd Reimann, Heerbrugg (CH); Alexandre Heili, Altstätten (CH); Dhiraj Mohan, Cobham (GB); José Deboni, Santo André (BR)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 35 days.

(21) Appl. No.: 15/853,466

(22) Filed: Dec. 22, 2017

(65) Prior Publication Data
US 2018/0177136 A1    Jun. 28, 2018

(30) Foreign Application Priority Data
Dec. 23, 2016   (EP) ..................... 16206777

(51) Int. Cl.
| | |
|---|---|
| *A01G 7/00* | (2006.01) |
| *G06N 20/00* | (2019.01) |
| *G06Q 10/06* | (2012.01) |
| *G06Q 50/02* | (2012.01) |
| *A01B 79/00* | (2006.01) |

(Continued)

(52) U.S. Cl.
CPC .............. *A01G 7/00* (2013.01); *A01B 79/005* (2013.01); *G06N 5/04* (2013.01); *G06N 20/00* (2019.01); *G06Q 10/06* (2013.01); *G06Q 50/02* (2013.01); *A01G 25/167* (2013.01); *Y02A 40/10* (2018.01)

(58) Field of Classification Search
CPC .......... A01G 7/00; A01G 25/167; G06N 5/04; G06N 20/00; A01B 79/005; G06Q 10/06; G06Q 50/02; G06Q 10/04; Y02A 40/10
USPC .......................................................... 706/12
See application file for complete search history.

(56) References Cited

U.S. PATENT DOCUMENTS

| | | |
|---|---|---|
| 5,884,225 A | 3/1999 | Allen et al. |
| 2005/0234691 A1 | 10/2005 | Singh et al. |
| 2013/0235183 A1 | 9/2013 | Redden |

(Continued)

FOREIGN PATENT DOCUMENTS

| | | |
|---|---|---|
| CN | 104063718 A | 9/2014 |
| CN | 105005782 A | 10/2015 |

(Continued)

OTHER PUBLICATIONS

Extended European Search Report dated Feb. 22, 2017 as received in Application No. 16206777.1.

*Primary Examiner* — Vu A Vu
(74) *Attorney, Agent, or Firm* — Maschoff Brennan

(57) ABSTRACT

A method and system for predicting soil and/or plant condition in precision agriculture with a classification of measurement data for providing an assignment of a measurement parcel to classes of interest. The assignment is used for providing action recommendations, particularly in real time or close to real time, to a farmer and/or to an agricultural device based on acquired measurement data, particularly remote sensing data, and wherein a classification model is trained by a machine learning algorithm, e.g. relying on deep learning for supervised and/or unsupervised learning, and is potentially continuously refined and adapted thanks to a feedback procedure.

14 Claims, 7 Drawing Sheets

(51) Int. Cl.
*G06N 5/04* (2006.01)
*A01G 25/16* (2006.01)

(56) References Cited

U.S. PATENT DOCUMENTS

| | | | |
|---|---|---|---|
| 2016/0224703 A1 | 8/2016 | Shriver | |
| 2016/0247079 A1* | 8/2016 | Mewes | G06N 5/048 |
| 2016/0247082 A1 | 8/2016 | Stehling et al. | |

FOREIGN PATENT DOCUMENTS

| | | |
|---|---|---|
| CN | 106203450 A | 12/2016 |
| EP | 3 046 066 A1 | 7/2016 |
| WO | 2016/116888 A1 | 7/2016 |
| WO | 2016/127094 A1 | 8/2016 |
| WO | 2016/183000 A1 | 11/2016 |

* cited by examiner

METHOD FOR PREDICTION OF SOIL AND/OR PLANT CONDITION

CROSS-REFERENCE TO RELATED APPLICATIONS

This application claims priority to European Patent Application No. 16206777 filed on Dec. 23, 2016. The foregoing patent application are incorporated herein by reference.

FIELD OF INVENTION

The present invention relates to a method and system for predicting soil and/or plant condition in precision agriculture with a classification of measurement data for providing an assignment of a measurement parcel to classes of interest.

BACKGROUND

In the general field of precision agriculture, farming is based on an advanced combination of modern observing, measuring, and analysis techniques for optimizing harvesting and returns while preserving resources. Farmers are provided with a wealth of information on their farms and their products, enabling improved decision-making and a high degree of optimization. In particular, precision agriculture optimizes farming management with regard to crop science, e.g. by optimizing fertilizer inputs, environmental protection, e.g. by reducing footprint of farming by limiting leaching of nitrogen, and economics, e.g. providing an enhanced crop with an improved input management and thus providing a higher competitiveness.

Precision farming involves gathering and analysing a database with a variety of data, e.g. data from spectral or hyperspectral soil and plant analysis, residual nitrogen, bio mass, plant health, and plant maturity, environmental data, e.g. local climatic conditions, humidity, sun position, terrain slope, and terrain altitude, or field history data, e.g. previous cultivation cycles and harvesting results, previous soil and plant treatment, and development of diseases.

Based on the data and analysis results, predictive models on soil content and field state may be developed providing elaborate recommendations of actions for a farmer. However, given the complexity of variables and economic strategies, the final analysis and decision is usually up to the farmer who particularly decides based on considerations such as expected business value, environmental impact, or availability of resources and equipment. Two types of data collection may be distinguished, i.e. remote sensing and ground truth analysis in a lab.

On the one hand, with remote sensing—e.g. by dedicated sensors at the front of a tractor or carried by a robot or drone, by a handheld instrument with dedicated sensors, or by plane or satellite imaging—measuring parameters—e.g. temperature, humidity, NDVI (Normalized Differenced Vegetation Index), EVI (Enhanced Vegetation Index), SAVI (Soil-Adjusted Vegetation Index), wind, geographic position, sun light incidence and solar irradiation, field slope and attitude—may be derived in real time or at least close to real time without interfering with the soil, e.g. by gathering probes. In particular, with remote sensing a high degree of automation may be possible.

On the other hand, ground truth analysis usually involves interfering with the soil, in particular gathering soil and plant probes, and dedicated and elaborate laboratory analysis. Typically, such probing and lab measurements are more time consuming than remote sensing and usually involve a higher degree of human interaction, i.e. preventing a high degree of automation. For example, such non-automated processes may take up to twenty days to gather soil probe measures, send them to the lab, get them analyzed and provide the results for action recommendations.

Laboratory measurements may in some cases be advantageous, e.g. in terms of available testing capabilities or an isolated testing environment. However, when comparing results from different labs it may still be required to take into account lab-to-lab variations, e.g. caused by use of different equipment, different accuracy requirements, or different normalization procedures. Furthermore, lab equipment is often expensive and measurements require a deeper knowledge and thus specialized personnel is needed, whereas for a broad application in agriculture a high degree of easy-to-use, particularly automated or robotic, gathering and analysis tools may be preferred.

Such easy to use and fast, particularly automated (and comparatively cheap), processing and analysis may be provided by remote sensing techniques. However, even with increasing computing power and data storage, the large complexity of agriculture systems with its variety of data and variables pushes current implementations to their limits and often a high degree of human interaction may still be required.

For analysing soil and/or plant condition of a particular farming field, measurement data need to be classified as representing different classes of interest, particularly the classes of interest further comprising possible hierarchical sub-classes, e.g.
   soil type
      mineral content,
      humidity level,
      soil density, etc.
   plant type
      plant health, e.g. well or ill with disease X
      plant state, e.g. well or dry
      bio mass,
      plant maturity, etc.

For example, classification may be based on feature vectors consisting of measured physical quantities, e.g. hyperspectral wavelengths obtained by a spectrometer.

Assigning such classes and subclasses to measurement data is not straightforward for a human, particularly due to high dimensionality, noisy data, lack of interpretability, etc. In attempt to automatize such assignment processes by computer-implemented solutions, many computational challenges are faced.

The acquired data may be unstructured and highly inhomogeneous with strong variations in data type, information content and resolution, data accuracy, and computational algorithms may need to cope with inhomogeneous and incomplete datasets. Moreover, since many measurement and data points need to be processed, efficient algorithms, e.g. implementing parallel computing, and large data storage are required.

Moreover, given the complexity and variety of e.g. physical, biological, environmental, and economic parameters and priorities, a decision algorithm for different precision farming applications or different cultivation areas may strongly vary with soil and plant type, geographical position, different seasons of the year, or economic goals. Therefore, many different definitions and/or sets of classes and subclasses may be required.

Application of machine learning algorithms allows an automation of different processes in classifying measurement data. Such a classification framework, based on a subclass of general machine learning (ML), provides a very efficient "learning approach" for pattern recognition as compared to rule-based programming. Machine learning algorithms can deal with tasks of large complexity, make use of implicit or explicit user feedback, thus becoming adaptive, and provide "per parcel" (data sample) probabilities of the classification. This saves time, reduces processing costs and decreases amount of manual work.

On the one hand, in so-called "supervised ML" an algorithm implicitly learns which characterizing properties (i.e. a combination of features) define target properties of parcels (such as class membership, affiliation to a sub-class, etc.) according to definitions made by the user when labelling training data.

On the other hand, in so-called "unsupervised ML" the algorithm finds hidden structure in unlabeled data, e.g. by finding groups of data samples sharing similar properties in feature space. This is called "clustering" or "segmentation".

Probabilistic classification algorithms further use statistical inference to find the best class for a given instance. Instead of simply determining a "best" class for each instance, probabilistic algorithms provide a probability of the instance being a member of each of the possible classes, wherein normally the one class with the highest probability is selected. This has several advantages over non-probabilistic algorithms, i.e. associating a confidence value for weighting its choice, and consequently, providing an option to abstain from a choice when its confidence value is too low.

However, usage of machine learning algorithms requires a lot of training data. In case of supervised machine learning, also labeling information (i.e. assignment of the object classes to the data) is necessary. The data acquisition, preparation and labeling requires a lot of efforts and time.

Summarizing, it is difficult in practice to use one pre-trained decision algorithm for a large variety of different precision farming applications with different definitions of classes, varying cultivation and economic goals, etc.

Even with increasing computing power and data storage, the large complexity required for automatically assigning particular classes of interest within measurement data pushes traditional methods, such as rule-based computational methods, to their limits, and a high degree of human interaction is still required.

BRIEF SUMMARY

It is therefore an object of some embodiments of the present invention to improve processes for assigning classes of interest within measurement data of a measurement parcel for predicting a soil and/or plant condition, particularly by improving current workflows and/or by enabling new workflows and precision farming applications.

Another object of some embodiments is to reduce the error rate as compared to existing workflows (e.g. "rules of thumb") in precision agriculture, particularly also to reduce the need for human intervention.

Another object of some embodiments of the present invention is to reduce overhead time for the data acquisition and analysis, and thus to enable real time or close to real time prediction of soil and/or plant condition for precision farming applications.

Those objects are achieved by realising the features of the independent claim. Features which further develop the invention in an alternative or advantageous manner are described in the dependent patent claims.

Some aspects of the invention relates to a method for predicting a soil and/or plant condition in precision agriculture, with acquisition of measurement data for at least one measurement parcel, which is at least partly captured by the measurement data, the measurement data comprising at least one of spectral sensor data, hyperspectral sensor data, humidity sensor data, position data, time data, sun position data, and terrain data, particularly slope; and a classification of the measurement data by a classification algorithm for providing an assignment of the at least one measurement parcel to at least one class of interest, based on the measurement data and an (a-priori) classification model comprising at least the at least one class of interest.

An assignment can mean an assignment into classes of interest (classification) or an assignment of values (regression). For the sake of simplicity, in the following the term "classification" is used both in a sense of classification and regression.

According to some embodiments of the invention, the assignment is processed by a feedback procedure providing feedback data comprising at least one of verification information for the assignment of the measurement parcel to the at least one class of interest, in particular at least one of a confirmation of the assignment, a rejection of the assignment, and a warning, particularly if the assignment is wrong or uncertain; change information of the assignment of the measurement parcel to the at least one class of interest, in particular at least one of removal of the assignment and re-assignment to another class of interest; a definition of a new class of interest, e.g. from scratch, by merging or splitting existing classes, or by adapting an existing class; an instruction for removal of a class of interest from the classification model; a first selection of the measurement data to be used for the classification; and identification of a second selection of the measurement data to be ignored for further processing; wherein the feedback data is provided to a training procedure, the training procedure being based on a machine learning algorithm, possibly relying on deep learning, e.g. for supervised learning and/or unsupervised learning, and providing update information for the classification model.

In particular, with the inventive method, suitable training data may be acquired and prepared with each measurement task, particularly reducing data storage, overhead time, and false classification, which lead to more accurate classification and more efficient training of a multitude of decision algorithms for a wide range of different agriculture applications, depending on a wide range of physical, biological, environmental, and economic parameters.

The feedback procedure may be executed close to real-time, e.g. during measuring by means of a feedback unit being part (integral or external) of an agricultural measurement device, or the feedback procedure may be executed offline, e.g. during a dedicated feedback workstep, e.g with a dedicated software tool installed on a computer or available in a cloud.

For example, an enriched and improved set of classification models provided by the inventive method allows to forecast soil content and plant health from hyperspectral data to be used in precision farming, e.g. to locally apply the right type and amount of fertilizer, water, and/or pesticide, to predict the amount of harvest and economic return, etc.

In a particular embodiment, the feedback data is provided based on at least one of explicit feedback by means of the feedback procedure, in particular based on at least one of feedback by an operator of a measurement device used for the acquisition of the measurement data, feedback by a software for processing of the measurement data, and feedback from a ground truth verification procedure, e.g. soil probe measurements corresponding to at least some of the data recordings; and implicit feedback, in particular based on at least one of an interpretation of a lack of explicit feedback as a confirmation of the assignment, a comparison of an actually executed action on the at least one measurement parcel with a proposal for an action being based on the assignment of the at least one measurement parcel, a quality assessment of the measurement data, particularly an automatic quality assessment by a control and evaluation functionality of the classification unit, e.g. regarding noise, systematic accuracy, or data completeness, and system settings of the measurement device used for the acquisition of the measurement data, particularly wherein the system settings are defined by an operator of the measurement device.

In another embodiment, the training procedure is adapted for processing a multitude of measurement data, feedback data and auxiliary data, wherein feedback data of classifications of a multitude of measurement data is provided to the training procedure, particularly wherein the feedback data being acquired by at least one measurement device, particularly a multitude of measurement devices, in particular wherein a defined access and upload to the training procedure being established; and/or additional data being provided to the training procedure, in particular the additional data comprising at least one of data of laboratory soil probe measurements, plant study data, and field history data for a measurement parcel, particularly indicating at least one of cultivation cycles, previous farming actions, biomass data from different harvests, and harvesting results.

In particular, the training procedure may provide a set of different classification models having specific classification parameters and/or specific classes of interest for at least one of a region-specific classification, a time-specific classification, a soil and/or plant type specific classification, and a history specific classification taking into account at least one of a cultivation history, a farming action history, and a harvesting history, wherein the provided classification model (from the set of classification models) for the classification of the measurement data being provided based on at least one of a location information, a time information, a soil and/or plant type information, and a field history information, corresponding with the acquisition of the measurement data.

For example, the classification model for the classification of the measurement data may be automatically provided based on data of a global positioning system and/or by data of a user input means for soil and/or plant type information and/or field history information.

For example, improved classifiers may be stored and shared on a central database, e.g. in a sense of a "classifier app-store", wherein access to specific classifiers may be based on a specific update interval, a user group for a specific agriculture application, a measurement location, or a measurement time, wherein the update may be performed automatically or wherein an operator of an agriculture measurement device can download the required model from the central database for a specific task.

Another embodiment is characterized in that the update information for the classification model is made available to a multitude of classification algorithms, in particular classification algorithms running on a multitude of classification units, e.g. in the form of different software installations on computers or integral to dedicated agricultural measurement devices, with a defined access to the update information and a defined update procedure.

Therefore, based on a particularly beneficial combination of a ML training procedure with an acquisition of a multitude of classification feedback and classification data in parallel with each data acquisition and classification of actual measurement data, many users may benefit from a multitude of generic decision algorithms learned on an ever-growing database from the community, e.g. covering a wide range of different farming applications and environmental scenarios.

In a particular embodiment the feedback procedure is supported by a notification functionality providing a status information of the classification, in particular comprising at least one of a notification when the assignment is finished, a notification when the classification has failed, and a quality assessment on the assignment, e.g. a warning if the assignment is uncertain, possibly with an indication on the degree of the uncertainty or the cause of the uncertainty.

For example, an uncertainty may occur for borderline cases, e.g. wherein—based on a given uncertainty in calculating feature vectors—measurement data have similar probability to be assigned to multiple classes. In such cases it may further be useful if the feedback procedure automatically asks for explicit user feedback before continuing processing.

The notification functionality may be based on at least one of a visual representation of the status information, in particular by a defined color coding and/or light coding when measurement data being assigned to different classes of interest and/or by a text message, and an acoustic notification of the status information, particularly an audio code or a voice signal, in particular wherein the notification functionality triggers the feedback procedure.

For example, feedback may be triggered through an audio output or an LED color indicator, providing a farmer with information such as "measured parcel assigned to class X", together with instructions for an action such as "low phosphorus/fertilization needed" or an information that no action is required, e.g. "healthy plant/no action needed". The farmer may then have the option to react within a defined time window, e.g. carrying out (or not) the corresponding action. Thus, in this way, a farmer may implicitly confirm the classification result, change the result, or define a new class of interest. If no action is required, refraining from reacting may also be interpreted as confirmation of the assignment. The farmer may further provide explicit feedback, e.g. on a dedicated screen or using a dedicated action button to explicitly delete a class of interest or select a subsample of the measurement data to be used for future classification and/or training. Upon completion of the assignment there may also be a pop-up of an input request requiring an operator of an agriculture measurement device to confirm the classification before sending data to the training procedure.

An offline user may review the classification by input means of the measuring device, an operating device associated with the measuring device, or input options of a dedicated office software running on a computer. In particular, the feedback procedure also comprise a visualization of a checklist, a functional diagram, a schematic illustration, or an image, e.g. a 2D or 3D image of the measured parcel wherein specific values or identifying features are highlighted by dedicated colors.

The classification performance is highly dependent on the type and characteristics of the measurement data to be classified. Therefore, a choice between different algorithms and different sets of classification parameters is required. For example, the classification may be based on at least one of a class of interest based on soil content and/or soil humidity; a class of interest based on at least one of plant status, plant health, and plant maturity; a class of interest based on bio mass; linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; deep learning, in particular based on a neural network, particularly a convolutional neural network; and learning vector quantization.

Some embodiments of the invention further relate to a system for predicting a soil and/or plant condition in precision agriculture, comprising a measurement device with a data acquisition unit for an acquisition of measurement data for at least one measurement parcel, the measurement data comprising at least one of spectral sensor data, hyperspectral sensor data, humidity sensor data, position data, time data, sun position data, and terrain data, particularly slope; and a classification unit for executing a classification of the measurement data by a classification algorithm for providing an assignment of the at least one measurement parcel to at least one class of interest, based on the measurement data and a classification model made available to the classification unit comprising at least the at least one class of interest.

According some embodiments of the invention, the system further comprises a feedback functionality for processing the assignment by a feedback procedure providing feedback data comprising at least one of verification information for the assignment of the measurement parcel to the at least one class of interest, in particular at least one of a confirmation of the assignment, a rejection of the assignment, and a warning, particularly if the assignment is wrong or uncertain; change information of the assignment of the measurement parcel to the at least one class of interest, in particular by at least one of removal of the assignment, and re-assignment to another class of interest; a definition of a new class of interest, in particular by at least one of modifying an existing class, splitting one existing class into two new classes, and merging two existing classes into one new class; an instruction for removal of a class of interest from the classification model; a first selection of the measurement data to be used for the classification; and identification of a second selection of the measurement data to be ignored for further processing; wherein the feedback data is provided to a training unit comprising a training procedure, the training procedure being based on a machine learning algorithm, possibly relying on deep learning, e.g. for supervised learning and/or unsupervised learning, and providing update information for the classification model.

In particular, the system is built such that the feedback data can be provided based on at least one of explicit feedback by means of the feedback functionality, in particular based on at least one of feedback by an operator of a measurement device used for the acquisition of the measurement data, feedback by a software for processing of the measurement data, and feedback from a ground truth verification procedure; and implicit feedback, in particular based on at least one of an interpretation of a lack of explicit feedback as a confirmation of the assignment, a comparison of an actually executed action on the at least one measurement parcel with a proposal for an action being based on the assignment of the at least one measurement parcel, a quality assessment of the measurement data, particularly an automatic quality assessment by a control and evaluation functionality of the classification unit, and system settings of the measurement device used for the acquisition of the measurement data, particularly wherein the system settings are defined by an operator of the measurement device.

In another embodiment, the training unit is built for processing a multitude of measurement data, feedback data and auxiliary data, particularly wherein feedback data of classifications of a multitude of measurement data being provided to the training unit, wherein the feedback data being acquired by at least one measurement device, particularly a multitude of measurement devices, in particular wherein a defined access and upload to the training unit being established, and/or additional data being provided to the training unit, in particular the additional data comprising at least one of data of laboratory soil probe measurements, plant study data, and field history data for a measurement parcel, particularly indicating at least one of cultivation cycles, previous farming actions, biomass data from different harvests, and harvesting results.

The training unit may further be adapted such that the training procedure provides a set of different classification models having specific classification parameters and/or specific classes of interest for at least one of a region-specific classification, a time-specific classification, a soil and/or plant type specific classification, and a history specific classification taking into account at least one of a cultivation history, a farming action history, and a harvesting history, wherein the classification model for the classification of the measurement data being provided based on at least one of a location information, a time information, a soil and/or plant type information, and a field history information, corresponding with the acquisition of the measurement data.

In particular, the system may be adapted such that the classification model for the classification of the measurement data may be automatically provided based on data of a global positioning system and/or by data of a user input means for soil and/or plant type information and/or field history information.

In another embodiment, the system is adapted such that the update information for the classification model is made available to a multitude of classification algorithms, in particular classification algorithms running on a multitude of classification units with a defined access to the update information and a defined update procedure.

The feedback procedure may be supported by a notification functionality providing a status information of the classification, in particular comprising at least one of a notification when the assignment is finished, a notification when the classification has failed, and a quality assessment of the assignment, particularly a warning if the assignment is uncertain, wherein the notification functionality being based on at least one of a visual representation of the status information, in particular by a defined color coding and/or light coding when measurement data being assigned to different classes of interest and/or by a text message, and an acoustic notification of the status information, particularly an audio code or a voice signal, in particular wherein the notification functionality triggers the feedback procedure.

In particular the system can be laid out such that the classification is based on at least one of a class of interest based on soil content and/or soil humidity; a class of interest based on at least one of plant status, plant health, and plant maturity; a class of interest based on bio mass; linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; deep learning, in particular based on a neural network, particularly a convolutional neural network; and learning vector quantization.

BRIEF SUMMARY OF THE DRAWINGS

The method and system according to the invention are described or explained in more detail below, purely by way of example, with reference to working examples shown schematically in the drawing. Specifically.

The diagrams of the figures should not be considered as being drawn to scale. Where appropriate, the same reference signs are used for the same features or for features with similar functionalities.

DETAILED DESCRIPTION

Figure 1:
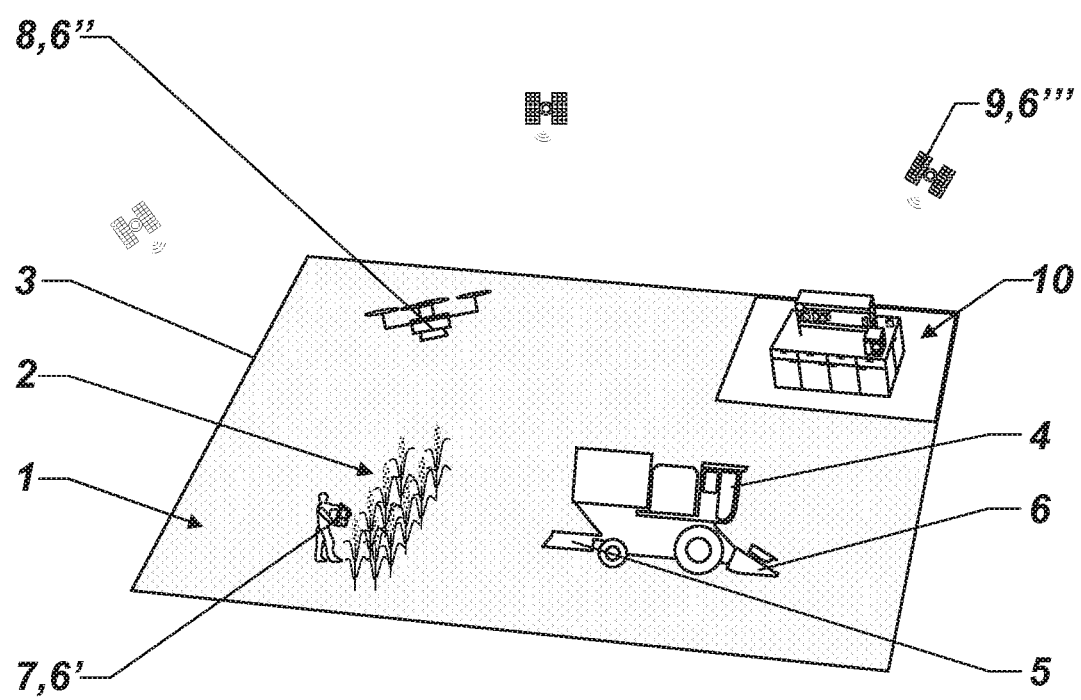
FIG. 1: an exemplary illustration of a precision agriculture application.

FIG. 1 shows an exemplary illustration in the field of precision agriculture, wherein farming is based on an advanced combination of modern observing, measuring, and analysis techniques for optimizing harvesting and returns. Farmers are provided with a wealth of measurement data and information on soil 1 and/or plants 2 and thus an actual or predicted state of a cultivation parcel 3 and its products may be derived, enabling improved decision-making and a high degree of optimization.

For example, based on such an optimization model a "smart tractor" 4 may be equipped with a dedicated action unit 5 for applying the right type and precise amount of fertilizer and/or e.g. water/pesticide, or e.g. an optimized seed planting pattern may be executed. The tractor 4 may further be equipped with a data acquisition unit 6 with dedicated sensors for remote sensing, e.g. a sensor for spectral measurements or imaging, e.g. infrared imaging or a sensor for deriving NDVI data, a sensor for hyperspectral data acquisition, a humidity sensor, a temperature sensor, a slope indicator, a weather station, a position sensor, e.g. by triangulation or GPS receiver, etc. The acquired data may then be processed, e.g. offline at a later time or online, e.g. in real time or close to real time, for triggering the next action.

Another data acquisition unit 6' with dedicated sensors may be part of a handheld instrument 7 and/or another data acquisition unit 6'' may be carried by a drone, e.g. an unmanned air vehicle 8 (UAV) or a mobile robot (not shown), or further data may be acquired by dedicated data acquisition units 6''' on a plane (not shown) or on satellites 9.

Alternatively or in addition, e.g. for providing ground truth and/or for calibrating remote sensing data, soil or plant probes may be taken and analysed, e.g. directly on the field or, more likely, in a dedicated lab facility 10. Such ground truth information can be used for supervised learning, and also within the feedback procedure where ground truth classes can be confronted to actual classification results, validating or rejecting them. Based on this feedback and stored measurement data, decision algorithms can be refined. Laboratory measurements may in some cases provide advanced testing capabilities but lab equipment is often expensive and lab measurements and analysis often require specialized personnel. Particularly since a higher degree of human interaction is required, such probing and corresponding lab measurements are typically more time consuming than analysis by remote sensing. For example, it may take up to twenty days to gather soil probe measures, send them to the lab, get them analyzed and provide action recommendations for the farmer.

Particularly in terms of easy handling and fast, e.g. automated, and comparatively inexpensive processing and analysis, remote sensing procedures may be very beneficial. However, even with increasing computing power and data storage, the large complexity of agriculture systems with its variety of data and variables pushes current implementations to their limits and error rates of automated classification of actual soil and/or plant conditions and resulting action recommendations are still quite high, particularly when seeking real time or close to real time analysis.

In practice it is difficult to use one general set of pre-trained decision algorithm for a large variety of different precision farming applications and, for example, many computational and interdependent systematic challenges are faced for improving on dedicated sets of classifiers and classes of interest, and thus to cover the large complexity of possible agricultural applications.

Figure 2:
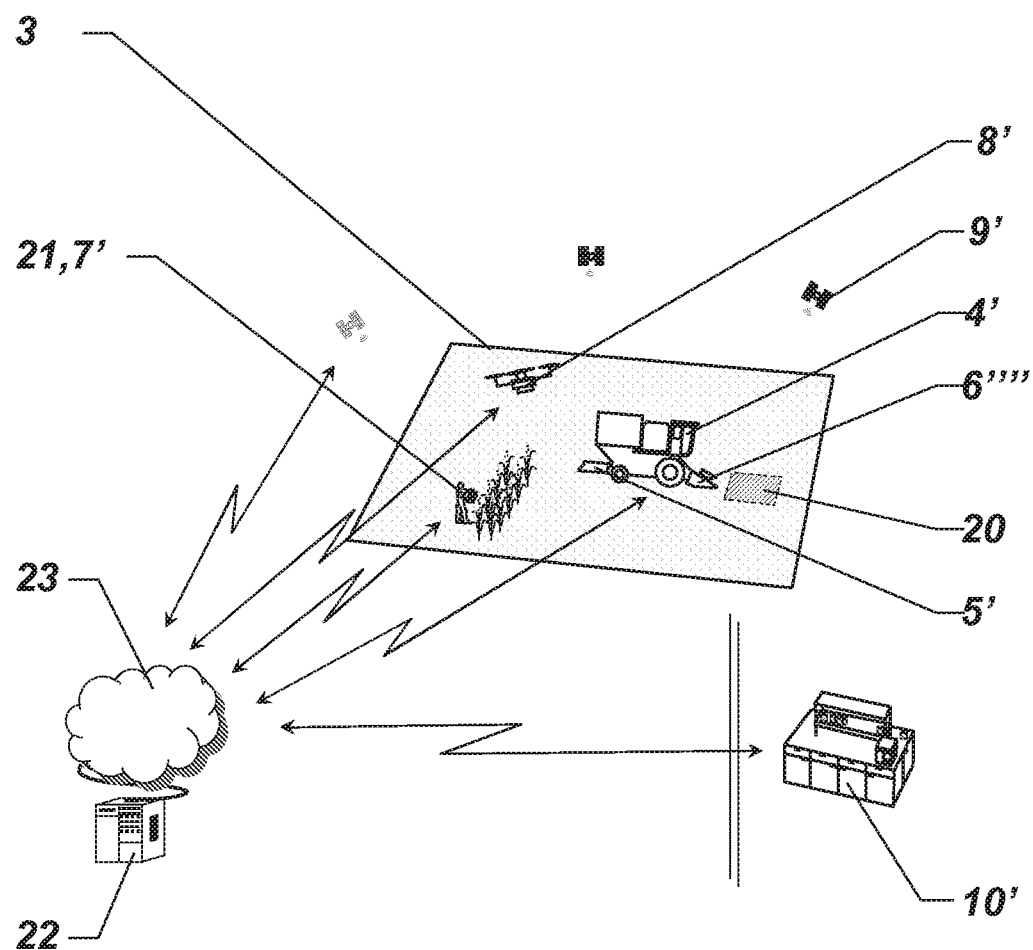
FIG. 2: an exemplary illustration of the inventive method for providing feedback on an assignment of a measurement parcel to a class of interest, wherein the assignment is used for providing action recommendations to a farmer and/or to an agricultural device.

FIG. 2 shows an exemplary illustration of the inventive method for providing feedback on an assignment of a measurement parcel 20, e.g. a patch of a cultivation parcel 3 (see FIG. 1), to a class of interest, wherein the assignment being used for providing action recommendations, particularly in real time or close to real time, to a farmer 21 and/or to an agricultural device based on acquired measurement data, particularly remote sensing data, and a (a-priori) classification model.

For example, with improved classification algorithms based on the inventive workflow a smart tractor, a fertilizer or harvester 4' may allow with a dedicated sensor 6'''' at the front to carry out in real time an optimal fertilizing with a dedicated action unit 5' at the back.

For improving on the classification model, e.g. on individual classifiers for a dedicated agriculture application, for a specific geographic location, for varying environmental conditions, or for specific economic boundary conditions, and thus to speed up classification while at the same time reducing the error rate of automated classification, a dedicated training procedure is embodied, particularly with a machine learning algorithm, wherein feedback by the user, particularly by a multitude of different users, is used to tailor dedicated classification models to different needs.

Feedback may comprise of verification information for the assignment of the measurement parcel 20 to a class of interest, e.g. a confirmation of the assignment, a rejection of the assignment, and a warning, particularly if the assignment is wrong or uncertain; change information of the assignment of the measurement parcel to a class of interest, e.g. removal of the assignment or re-assignment to another class of interest; a definition of a new class of interest; an instruction for removal of a class of interest from the classification model; a selection of the measurement data to be used for the classification; or identification of another selection of the measurement data to be ignored for further processing.

An automatic assignment of classes and subclasses within measurement data often requires time-consuming preparation processes, in particular for defining dedicated classifying parameters, e.g. for the calculation of feature vectors consisting of measured physical quantities, e.g. hyperspectral wavelengths obtained via a spectrometer.

The acquired data is often unstructured and highly inhomogeneous with strong variations in data type, information content and resolution, data accuracy, and computational algorithms may need to cope with inhomogeneous and incomplete datasets. Moreover, given the complexity and variety of e.g. physical, biological, environmental, and economic parameters and priorities, a decision algorithm for different precision farming applications or different cultivation areas may strongly vary, e.g., with soil and plant type, geographical position, climate zone, time of day or different seasons of the year, or economic goals.

Application of machine learning algorithms allows an automation of different processes in classifying measurement data. Such a classification algorithm, based on a subclass of general machine learning (ML), provides a very efficient "learning approach" for pattern recognition as compared to rule-based programming. Machine learning algorithms can deal with tasks of large complexity, make use of implicit or explicit user feedback, thus becoming adaptive, and provide "per parcel" probabilities of the classification. This saves time, reduces processing costs and decreases amount of preparation work.

However, usage of machine learning algorithms requires a lot of training data. In case of supervised machine learning also labeling information (i.e. assignment of the object classes to the data) is necessary. Because of the complexity and the wide range of different applications with varying classification parameters and classes of interest, the data acquisition, preparation and labeling requires great effort.

Furthermore, for the selection of suitable training data a lot of data surplus is acquired, often pushing data handling and data storage to the limit. Modern measurement devices are able to acquire terabytes of data per day. Therefore, a data reduction, i.e. elimination of non relevant data or data without additional information content based on classification feedback is advantageous.

For example, generic classification models may be learned on an external, global server unit 22, possibly available in a cloud 23, wherein users may upload measurement data, particularly remote sensing data or ground truth data, as well as feedback on the data, applications, and/or classifiers, and hence provide new information to enrich a training database and the training procedure for improving an (a-priori) classification model. In particular, training with feedback on an actual performance of a classification model provides smarter classification algorithms, e.g. with respect to geography, soil type, and/or seasonal dependency.

A dedicated feedback procedure, e.g. implemented on an improved agriculture measurement device or a dedicated feedback device, is used to provide explicit feedback, e.g. by an operator of a smart tractor 4' with a dedicated data acquisition unit 6'''' and a feedback terminal (not shown), or by a farmer 21 using a handheld agriculture measurement device 7' with a feedback functionality. A farmer may also provide feedback using a dedicated feedback device, e.g. a remote control unit for controlling a drone 8' with feedback functionality, or a tablet for providing feedback on satellite-based 9' measurements or classifications. Explicit feedback may also be given by a laboratory employee, e.g. based on a ground truth verification procedure for selected sensor recordings carried out in an external lab 10'.

In addition, a farmer 21 may provide additional data to the training procedure, e.g. to report on field history, e.g. previous cultivation cycles, plant study data, or, at a later time, to report on harvesting results.

Feedback may further be given implicitly, e.g. by interpreting fertilizing according to an action proposal based on a classification as positive feedback or by rejecting results and carrying out a different action (e.g. negative feedback). A lack of explicit feedback may also be interpreted as confirmation of an assignment (positive feedback). Furthermore, implicit feedback may be based on a control and evaluation functionality of the measurement device which (automatically) carries out a quality assessment of the measurement data, e.g. regarding noise, systematic accuracy, or data completeness. System settings of a measurement device for acquiring measurement data, e.g. automatically set by environmental sensors or by an operator, may also be used for providing implicit feedback.

For example, implicit feedback may be triggered by a notification functionality, e.g. through an audio output or an LED color indicator, providing an operator of a smart tractor 4' with information such as "measured parcel assigned to class X", together with instructions such as "low phosphorus/fertilization needed", "low humidity/water needed", or "healthy plant/no action needed". The farmer or an operator of the smart tractor 4' may then have the option to react within a defined time window, e.g. carrying out (or not) the corresponding action, or in case of an automated procedure, refraining from reacting may also be interpreted as confirmation of the assignment.

In summary, according to the invention, classification feedback for a training procedure—particularly for a training procedure being based on machine learning—is acquired in parallel with each data acquisition and classification of actual measurement data. Thus, many users may benefit from a multitude of generic decision algorithms learned on an ever-growing database from the community, and contribute themselves during their daily work to the improvement of a decision algorithm of an (a-priori) model by providing measurement data, feedback, and auxiliary data, while at the same time improving classification accuracy for their own applications.

Alternatively, the inventive method may also be implemented with a defined access to the update information and a defined update procedure for classification units of individual agriculture devices, and/or with a defined upload procedure being established for data and information transfer to the training procedure, e.g. to a training cloud 23, for example if a user prefers to keep his data private. For example, improved classifiers may be stored on a central server unit 22, wherein access to specific classifiers may be restricted, e.g. based on user groups, wherein an operator of a measurement device can download the required model from the central database for a specific agriculture application.

In particular, for a given agriculture application on a given geographic position at a given time of the year, an optimal classification model may be automatically provided based on data of a global positioning system and/or by data of a user input means for soil and/or plant type information and/or field history information.

According to the invention, various implementations and arrangements are possible for the data acquisition unit, the classification unit, the feedback functionality, and the training unit. A selection of different implementations is schematically illustrated by FIGS. 3a to 3e.

Figure 3A:
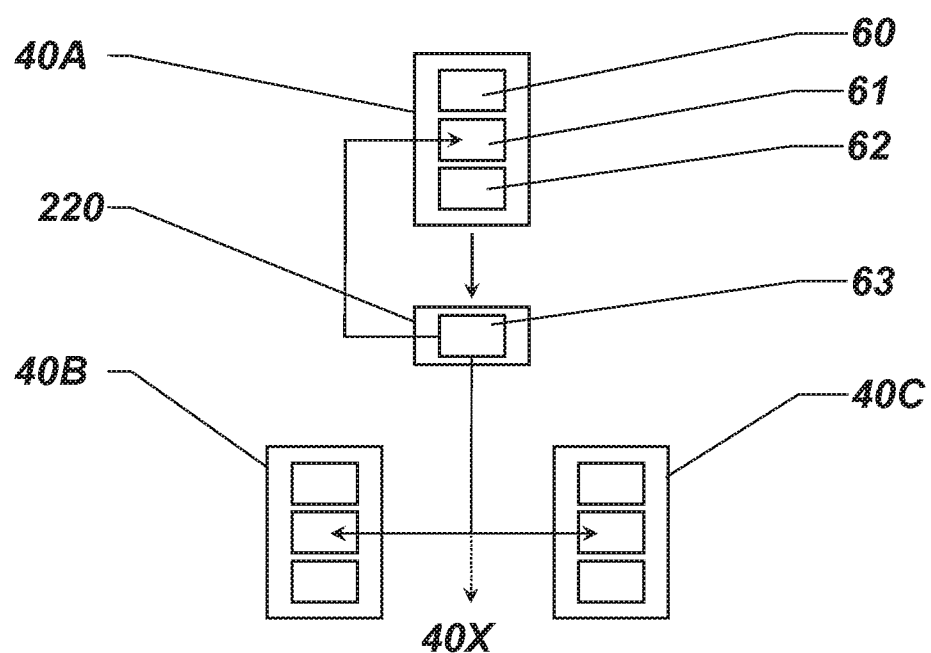
FIG. 3a-e: schematic embodiments of different arrangements of the data acquisition unit, the classification unit, the feedback unit, the training unit, and additional units for data and/or information input.

FIG. 3a shows an embodiment wherein measurement data for a measurement parcel 20 (see FIG. 2) are acquired with a data acquisition unit 60 of a first agricultural measurement device 40A. Based on the measurement data and a classification model made available to a classification unit 61, a first classification is performed, e.g. the measurement parcel is assigned to a class of interest such as a particular soil and/or plant type or a particular farming action.

An operator of the agricultural measurement device 40A is informed about the classification results e.g. on an instrument screen, an audio output, or by a visual notification such as an LED color indicator. The operator then—either implicitly or explicitly—provides feedback about the classification by means of an implicit feedback functionality or a feedback unit 62 which creates feedback data, e.g. the operator may carry out (or not) the recommended action such as spraying or fertilizing with the action unit 6"" (FIG. 2) and thereby implicitly confirm the classification result, change the result, or define a new class of interest, and the operator may explicitly delete a class of interest or select a subsample of the measurement data to be used for future classification and/or training.

The feedback data are transmitted to a training unit 63, e.g. stored on an external server 220, where a classifier is trained and improved based on a training procedure, particularly a training procedure based on machine learning. The ML platform hence becomes smarter by learning about time, region, soil and/or plant type and actions by the farmer's feedback.

An improved model, i.e. comprising an improved decision algorithm, is then transmitted to a set of defined agricultural measurement devices 40A,40B,40C,40X (not shown) for an update of their classification algorithm, and thus allowing their classification algorithms to achieve higher accuracy.

Figure 3B:
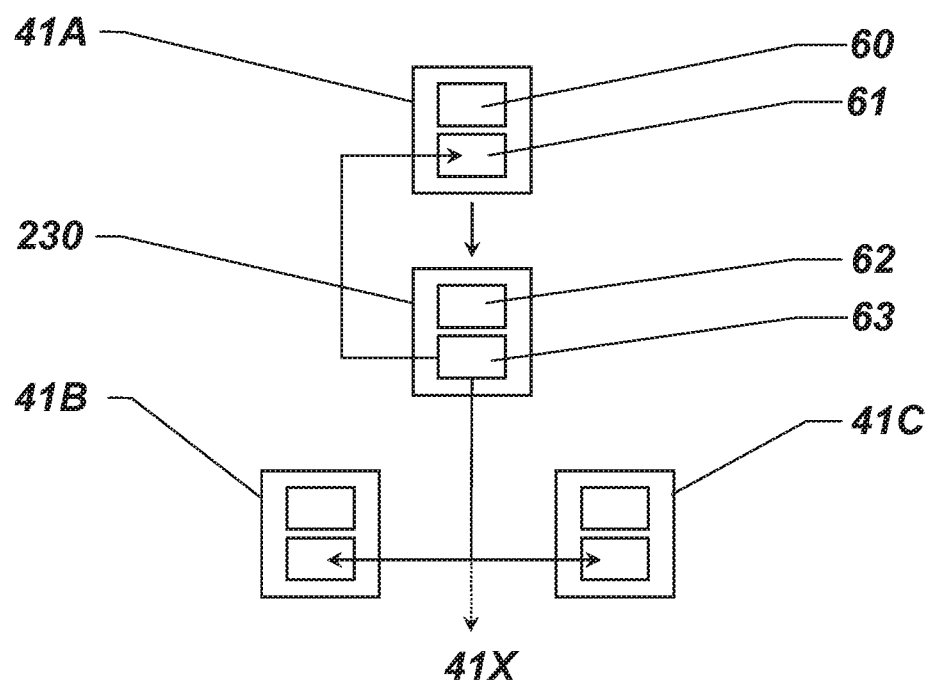

Alternatively or in addition (not shown), the improved classification model may be rolled out to a software product for classifying data, e.g. stored on a dedicated computer or central server FIG. 3b shows an embodiment wherein measurement data for a measurement parcel 20 (see FIG. 2) are acquired with a data acquisition unit 60 of a first agricultural measurement device 41A. Based on the measurement data and a classification model stored on a classification unit 61 integral with the first measurement device 41A, a first classification is performed based on a classification model. For example, the first measurement device 41A may be a handheld device with a dedicated sensor and a data processing unit with prediction capability.

The measurement data and the first classification result are transmitted to a computer 230 comprising a feedback unit 62, e.g. a dedicated agricultural software product where a user, e.g. an online user such as the operator of the agricultural device 41A or an offline user in an office, provides feedback about the classification, which creates feedback data for a training unit 63, here stored on the same computer 230. For example, a farmer may later provide feedback on the classification results by carrying out additional soil probe measurements in the lab, by reporting bio mass from the actual harvest, etc.

Figure 3C:
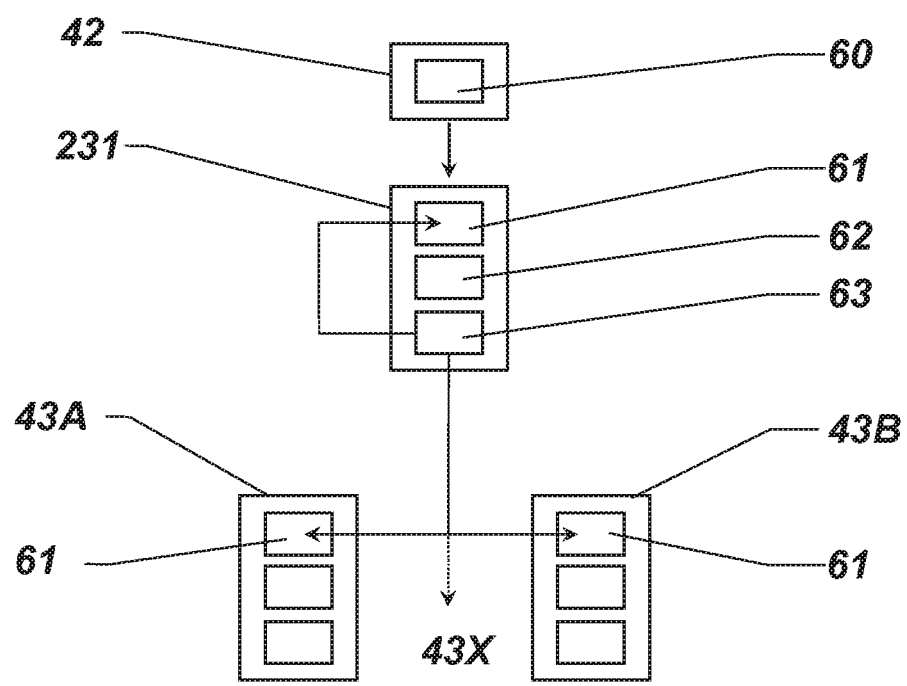

The improved model, e.g. with an improved classifier, is then rolled out, e.g. transmitted to a set of defined agricultural measurement devices 41A, 41B,41C,41X (not shown) for an update of their classification algorithms, and/or the improved model may be provided to a software product installed on a dedicated computer or server (not shown, e.g. see FIG. 3c).

FIG. 3c shows an embodiment wherein measurement data are generated by a data acquisition unit 60 of a generic agriculture measurement device 42 without classification functionality, e.g. only a sensor without data processing. The measurement data are imported into a dedicated software product, which is stored on a computer 231 and comes with an automatic classification functionality 61 for classifying the measurement data based on a classification model. Here, the software may further comprise a feedback functionality 62 and a training functionality 63, wherein a user, e.g. offline in an office, provides implicit or explicit feedback by means of the feedback functionality 62, which creates feedback data for the training functionality 63 of the software.

Then the improved model with an improved decision algorithm is made available to the classification part 61 of the software product and transmitted to a set of defined other devices/platforms 43A,43B,43X (not shown) having a classification functionality 61 for an update of their classification algorithms.

Figure 3D:
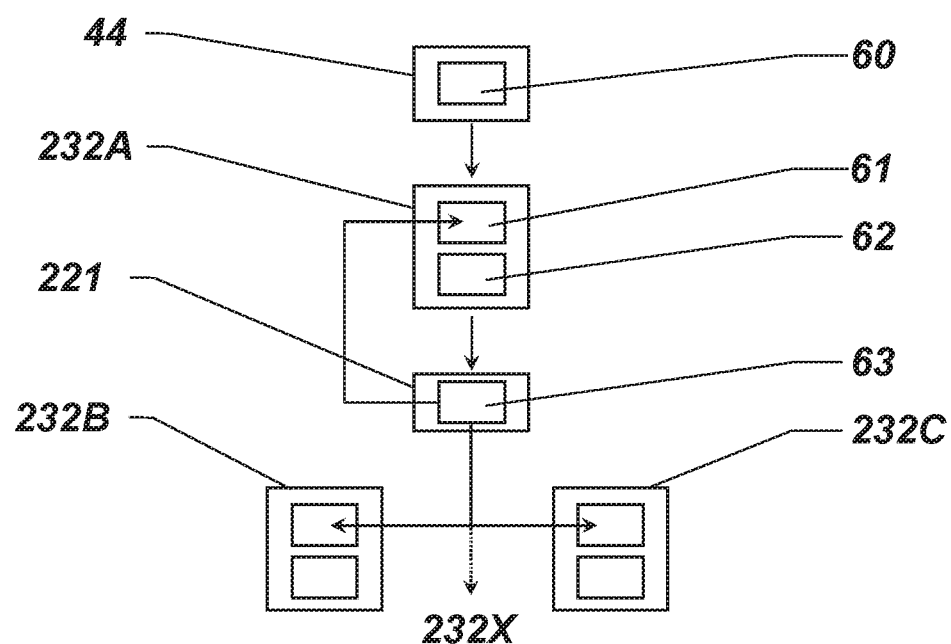

FIG. 3d shows an embodiment wherein measurement data are generated by a data acquisition unit 60 of an agricultural measurement device 44, e.g. a generic measurement device without classification functionality. The measurement data are transmitted onto a first computer 232A comprising a dedicated software product with automatic classification functionality 61, based on a classification model, and a feedback portion 62 for providing feedback data. The feedback data, and possibly additional data such as ground truth data, are then provided to a training procedure, here for example stored on a central server 221, e.g. in the form of a cloud, for training classifiers and providing an improved classification model.

Then, the improved classification model is distributed from the central server 221 as an update to a set of instances of the software product installed on different computers 232A,232B,232C,232X (not shown), and/or to an agricultural measurement device having a classification unit (not shown, e.g. see FIG. 3a).

Figure 3E:
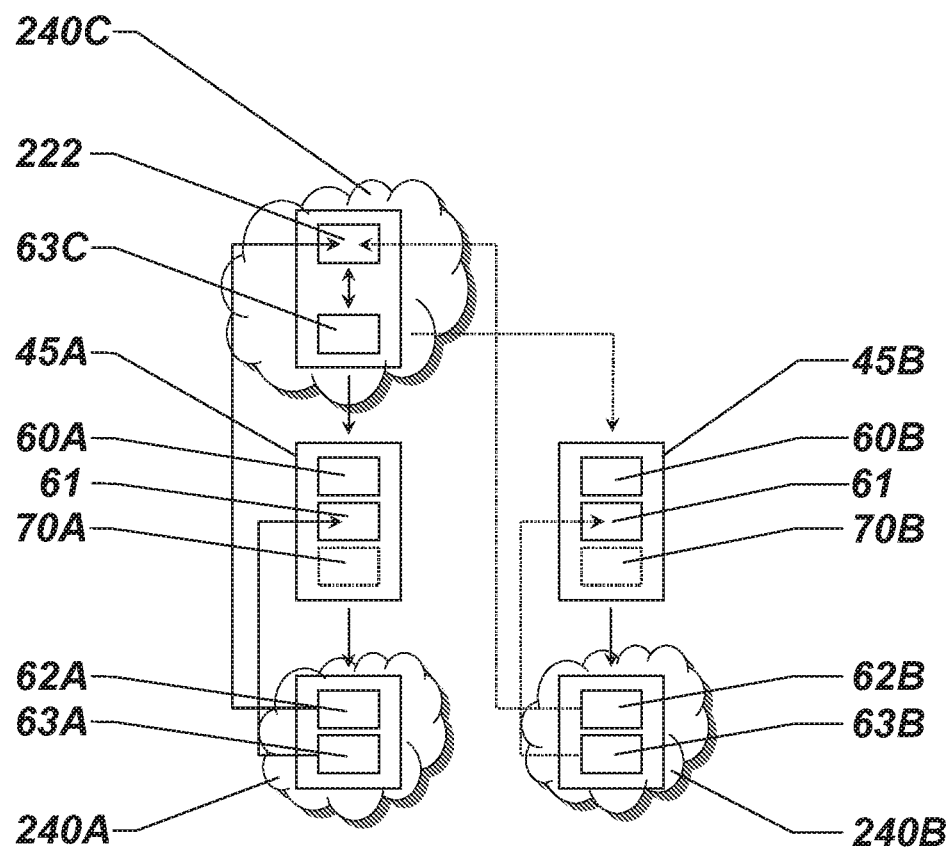

FIG. 3e embodies the generic proposed ML process wherein feedback by the farmer is used to tailor classification models to his specific needs, e.g. his specific agriculture application, a specific economic strategy, type of available measurement devices, and/or a specific field history. His device 45A, acquiring measurement data with a data acquisition unit 60A, e.g. a specific sensor type, and having a classification functionality 61, first applies generic classification models learned on an external, global database 222, possibly available on a (global) cloud 240C. The farmer then has the possibility to provide additional data 70A, e.g. based on ground truth, e.g. soil probe measurements corresponding to at least some of the sensor recordings 60A that have been made by the device, particularly wherein such ground-truthing may not be in real-time. A feedback portion 62A, here embodied in a dedicated cloud 240A, e.g. a local cloud for a set of agriculture facilities of the farmer, may then compare newly available ground truth to classifier outputs and (implicitly) derive feedback for a local training portion 63A, which derives a refined classifier that focuses on specific local needs and by not making the mistakes on the farmer's data that were made by the generic classifiers of the global database 222. Such a specialized classifier may then be updated locally for the farmer's device 45A. At the same time, the feedback module 62A may also update the external database 222 with newly available feedback, ground truth, and data samples, and the generic classifiers may be relearned by a global training unit 63C.

Other farmers can then benefit from a wide range of specialized and generic classifiers learned on an ever-growing database from the community, and contribute themselves by providing some of their feedback, ground truth, and data samples, while at the same time improving classification accuracy for their applications.

For example, a second farmer may be in a similar workframe as the first farmer, e.g. with regard to agriculture application, farming facilities, soil and/or plant type, climate zone, economic situation, etc. This second farmer, e.g. using a similar measurement device 45B with a similar sensor 60B, may then immediately benefit from the work of the first farmer, and tailor the classification further to his own specific needs, e.g. by also processing additional data 70B and feedback 62B within his own 240B cloud or by providing data to the global cloud 240C.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for predicting a soil or plant condition in precision agriculture, the method comprising:
    acquiring measurement data for at least one measurement parcel, which is at least partly captured by the measurement data, the measurement data comprising spectral sensor data; and
    classifying the measurement data using a classification algorithm for providing an assignment of the at least one measurement parcel to at least one class of interest, based on:
    the measurement data, and
    a classification model comprising at least the at least one class of interest, wherein the assignment is performed using a feedback procedure providing feedback data comprising at least one of:
        verification information for the assignment of the measurement parcel to the at least one class of interest,
        change information of the assignment of the measurement parcel to the at least one class of interest,
        a definition of a new class of interest,
        an instruction for removal of a class of interest from the classification model,
        a first selection of the measurement data to be used for the classification, and
        identification of a second selection of the measurement data to be ignored for further processing,
    wherein the feedback data is provided to a training procedure, the training procedure being based on a machine learning algorithm and providing update information for the classification model, wherein the feedback data is provided based on implicit feedback, wherein the implicit feedback is based on at least one of:
        an interpretation of a lack of explicit feedback as a confirmation of the assignment, or
        a comparison of an actually executed action on the at least one measurement parcel with a proposal for an action being based on the assignment of the at least one measurement parcel.

2. The method according to claim 1, wherein the feedback data is provided based on explicit feedback by means of the feedback procedure.

3. The method according to claim 1, wherein training procedure is adapted for processing a multitude of measurement data, feedback data and auxiliary data.

4. The method according to claim 1, wherein the training procedure provides a set of different classification models having specific classification parameters or specific classes of interest for at least one of:
    a region-specific classification,
    a time-specific classification,
    a soil and/or plant type specific classification, and
    a history specific classification taking into account at least one of a cultivation history, a farming action history, and a harvesting history,
wherein the classification model from the set of classification models for the classification of the measurement data being provided based on at least one of:
    a location information,
    a time information,
    a soil and/or plant type information, and
    a field history information,
corresponding with the acquisition of the measurement data.

5. The method according to claim 1, wherein the update information for the classification model is made available to a multitude of classification algorithms.

6. The method of claim 1, wherein the feedback procedure is supported by a notification functionality providing a status information of the classification,
    wherein the notification functionality being based on at least one of:
        a visual representation of the status information, and
        an acoustic notification of the status information.

7. The method according to claim 1, wherein the classification is based on at least one of:
    a class of interest based on soil content or soil humidity,
    a class of interest based on at least one of plant status, plant health, and plant maturity,
    a class of interest based on bio mass,
    linear classification,
    a support vector machine,
    a quadratic classifier,
    Kernel estimation,
    boosting,
    a decision tree,
    deep learning,
    learning vector quantization.

8. A system for predicting a soil or plant condition in precision agriculture, the comprising:
    a measurement device with a data acquisition unit for an acquiring measurement data for at least one measurement parcel, the measurement data comprising
    spectral sensor data;
    a classification unit for executing a classification of the measurement data using a classification algorithm for providing an assignment of the at least one measurement parcel to at least one class of interest, based on the measurement data and a classification model made available to the classification unit comprising at least the at least one class of interest;
    a feedback functionality for processing the assignment by a feedback procedure providing feedback data comprising at least one of:
        verification information for the assignment of the measurement parcel to the at least one class of interest,
        change information of the assignment of the measurement parcel to the at least one class of interest,
        a definition of a new class of interest,
        an instruction for removal of a class of interest from the classification model,
        a first selection of the measurement data to be used for the classification, and
        identification of a second selection of the measurement data to be ignored for further processing, and wherein the feedback data is provided to a training unit comprising a training procedure, the training procedure being based on a machine learning algorithm and providing update information for the classification model, wherein the feedback data is provided based on implicit feedback, wherein the implicit feedback is based on at least one of:

an interpretation of a lack of explicit feedback as a confirmation of the assignment, or a comparison of an actually executed action on the at least one measurement parcel with a proposal for an action being based on the assignment of the at least one measurement parcel.

9. The system according to claim 8, wherein the system is built such that the feedback data can be provided based on explicit feedback by means of the feedback functionality.

10. The system according to claim 8, wherein the training unit is built for processing a multitude of measurement data, feedback data and auxiliary data.

11. The system according to claim 8, wherein the training unit is adapted such that the training procedure provides a set of different classification models having specific classification parameters or specific classes of interest for at least one of:

a region-specific classification,
a time-specific classification,
a soil or plant type specific classification, and
a history specific classification taking into account at least one of a cultivation history, a farming action history, and a harvesting history, wherein the classification model of the set of different classification models for the classification of the measurement data being provided based on at least one of:

a location information,
a time information,
a soil or plant type information, and
a field history information, corresponding with the acquisition of the measurement data.

12. The system according to claim 8, wherein the update information for the classification model is made available to a multitude of classification algorithms.

13. The system according to claim 12, wherein the feedback procedure is supported by a notification functionality providing a status information of the classification.

14. The system according to claim 8, wherein the classification is based on at least one of:

a class of interest based on soil content or soil humidity,
a class of interest based on at least one of plant status, plant health, and plant maturity,
a class of interest based on bio mass,
linear classification,
a support vector machine,
a quadratic classifier,
Kernel estimation,
boosting,
a decision tree, deep learning, and
learning vector quantization.

* * * * *